United States Patent
Kurita et al.

(10) Patent No.: US 8,218,405 B2
(45) Date of Patent: Jul. 10, 2012

(54) HEAD SLIDER AND DISK DRIVE

(75) Inventors: Masayuki Kurita, Kanagawa (JP);
Toshiya Shiramatsu, Kanagawa (JP);
Irizo Naniwa, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 368 days.

(21) Appl. No.: 12/386,235

(22) Filed: Apr. 14, 2009

(65) Prior Publication Data

US 2009/0262608 A1 Oct. 22, 2009

(30) Foreign Application Priority Data

Apr. 18, 2008 (JP) ................................. 2008-109358

(51) Int. Cl.
*G11B 11/00* (2006.01)
(52) U.S. Cl. ................. 369/13.24; 369/112.27; 360/317
(58) Field of Classification Search ............... 369/13.02, 369/13.24, 112.27, 13.14, 13.33, 124.01, 369/47.1, 13.17; 385/37, 129, 130, 14; 360/59, 360/125, 317, 126, 125.01; 720/659
See application file for complete search history.

(56) References Cited

U.S. PATENT DOCUMENTS

| 7,266,268 | B2 * | 9/2007 | Challener et al. ............... 385/37 |
| 7,310,206 | B2 * | 12/2007 | Liu et al. ........................ 360/317 |
| 7,365,941 | B2 * | 4/2008 | Poon et al. ............... 360/125.01 |
| 2007/0139818 | A1 | 6/2007 | Shimazawa et al. |
| 2007/0177306 | A1 | 8/2007 | Kubotera et al. |

FOREIGN PATENT DOCUMENTS

JP 2006-120292 5/2006

* cited by examiner

*Primary Examiner* — Ali Neyzari
(74) *Attorney, Agent, or Firm* — GMG Intellectual Property Law; Guadalupe M. Garcia

(57) ABSTRACT

Embodiments of the present invention provide a technique for projecting both a write element portion in writing and a read element portion in reading, and controlling a projecting distance of each write element and read element. According to one embodiment, a light absorbing member and a thermally expanding member are formed near a read element, and light is irradiated to the light absorbing member, thereby a read element is projected. Alternatively, light absorbing members, which absorb light having different wavelengths from each other, and thermally expanding members are formed near a write element and near the read element respectively, and a wavelength or intensity of light to be irradiated is changed, thereby a projecting distance of each of the write element and the read element is individually optionally controlled.

19 Claims, 9 Drawing Sheets

HEAD SLIDER AND DISK DRIVE

CROSS-REFERENCE TO RELATED APPLICATION

The instant nonprovisional patent application claims priority to Japanese Patent Application No. 2008-109358 filed Apr. 18, 2008, and which is incorporated by reference in its entirety herein for all purposes.

BACKGROUND OF THE INVENTION

A technique (Thermal Flying-height Control, hereinafter "TFC") is used, in which Joule heat generated by applying a current to a thin-film coil, is used to project a head portion so as to reduce a space between a head (an element region in the head portion) and a disk. However, since a wide area of the head portion is projected in the TFC, it is difficult to selectively project a region (element region) to be desirably the lowest point.

Thermally assisted magnetic recording is advanced in research and development as a technique for improving surface recording density of a magnetic disk drive (as an example of a disk drive). In the thermally assisted magnetic recording, use of near-field light is investigated as an approach to momentarily heating a small write area on a disk. To generate the near-field light, laser light is introduced into a near-field optical element disposed near a write pole of a magnetic head. Laser light that reaches the near-field optical element is partially converted into near-field light and heats a write area on a disk. However, the laser light is largely converted into heat in the near-field optical element, so that a region near the magnetic pole locally projects due to thermal expansion.

In the light of this, it is considered that heat generation in the near-field optical element for thermally assisted magnetic recording is used to project a magnetic head so as to reduce magnetic spacing, as is described in Japanese Patent Publication No. 2007-193906. In a thermally assisted magnetic recording head disclosed in that document, a thermal expansion layer including a material having a high linear expansion coefficient is provided between a magnetic pole and a near-field light generating portion, and heat generated during introducing laser light into the near-field generating portion is used to locally project a magnetic head portion.

However, this approach offers the following problem. Specifically, since laser light during performing thermally assisted magnetic recording is used to generate heat, input into the thermal expansion layer is inevitably synchronized with writing. That is, a projecting distance or projecting timing cannot be optionally controlled. Furthermore, a read element portion cannot be projected in reading.

In short, while a write element portion may be projected by heat generated by a coil in writing, a means for projecting a read element portion is not provided. Moreover, when laser light in thermally assisted magnetic recording is used to generate heat, a projecting distance or projecting timing cannot be optionally controlled.

BRIEF SUMMARY OF THE INVENTION

Embodiments of the present invention provide a technique for projecting both a write element portion in writing and a read element portion in reading, and also controlling a projecting distance of the write element and the read element. According to the embodiment of FIG. 2, a light absorbing member 91 and a thermally expanding member are formed near a read element, and light is irradiated to the light absorbing member 91, thereby a read element 22 is projected. Alternatively, light absorbing members 90 and 91, which absorb light having different wavelengths from each other, and thermally expanding members are formed near a write element and near the read element 22 respectively, and a wavelength or intensity of light to be irradiated is changed, thereby a projecting distance of each of the write element and the read element 22 is individually optionally controlled.

DETAILED DESCRIPTION OF THE INVENTION

Embodiments of the present invention relate to a head slider being adjusted in flying height by using thermal expansion, and relate to a disk drive.

Embodiments of the invention provide a technique, by which not only a write element portion in writing but also a read element portion in reading may be projected, in addition, a projecting distance of each of the write element and the read element may be controlled.

A head slider according to embodiments of the invention includes a write element, a read element, a light absorbing member provided near a read element compared with the middle between the write element and the read element, and a light source that irradiates light to the light absorbing member.

The head slider may include a waveguide that guides light from the light source into the light absorbing member, a light generating element that irradiates the light from the light source to the outside of the head slider, a second waveguide that guides light from the light source into the light generating element, and a second light absorbing member provided in the second waveguide.

A disk drive according to embodiments of the invention includes a head slider having a medium to be written with information, a write element that writes information into the medium, a read element that reads information written in the medium, and a light absorbing member provided near a read element compared with the middle between the write element and the read element; a light source that irradiates light to the light absorbing member; and a controller that positions the head slider on the medium, and allows information to be written into the medium, and allows information to be read from the medium, and controls the light source.

According to embodiments of the invention, a two-wavelength laser is used, and light absorbing members that absorb light having respective wavelengths and convert the light into heat are disposed near a write element and a read element respectively, and the laser wavelengths are appropriately changed from each other, so that a region near the write element and a region near the read element may be individually projected. Moreover, a projecting distance may be controlled by controlling laser power. Moreover, a prism is disposed at an appropriate place, thereby the degree of freedom of a setting position of the light absorbing member is increased, and furthermore an optional region may be projected.

Even if a single-wavelength laser is used, not only a write element portion but also a read element portion may be projected by using a crystal cell and a polarizing beam splitter together, by using a movable light source, by using a movable mirror, by combined use with TFC, or by using a beam splitter.

Hereinafter, examples using embodiments of the invention will be described using drawings.

EXAMPLE 1

Figure 1:
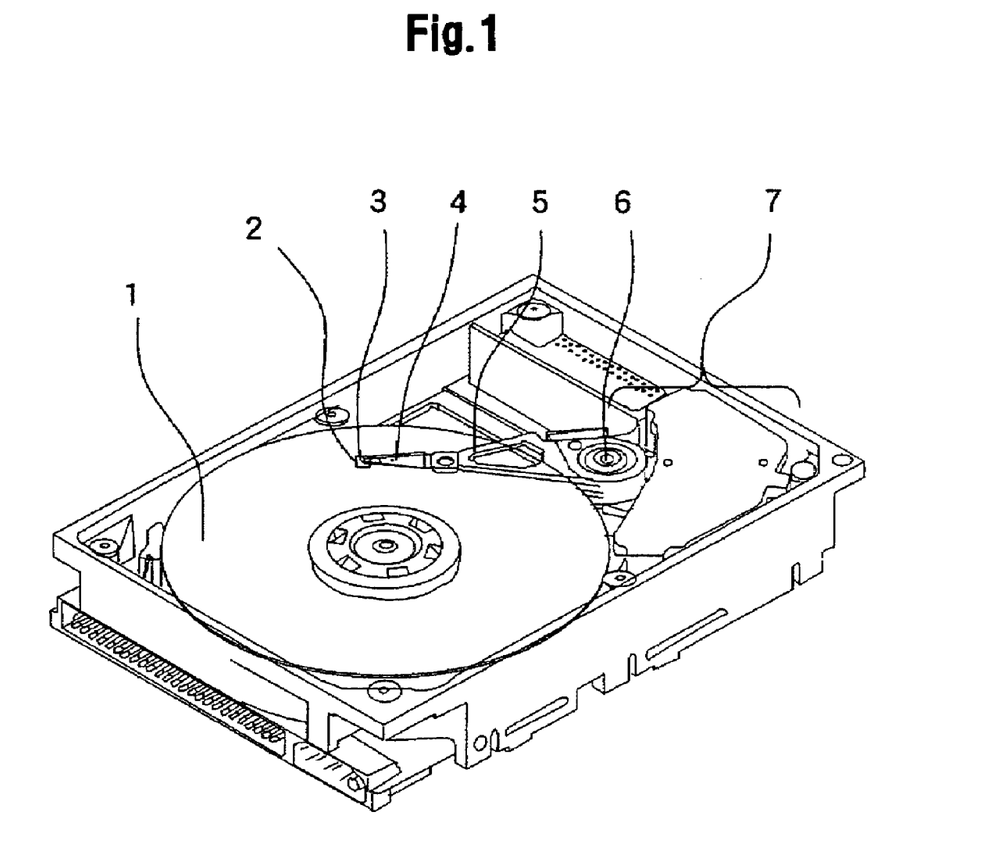
FIG. 1 is an exemplary perspective view showing the inside of a magnetic disk drive using embodiments of the invention.

FIG. 1 shows a perspective view showing the inside of a magnetic disk drive using flying height adjustment means of a magnetic head. In FIG. 1, a magnetic disk 1 being a medium to be written with information is rotatably supported. a slider (head slider) 3 having a magnetic head 2, which writes information into the magnetic disk 1 or read information from the magnetic disk 1, flies above a recording surface of the magnetic disk 1 with a predetermined space. The slider 3 is supported by a suspension 4, and the suspension 4 is supported by a carriage arm 5. The carriage arm 5 is swingably supported with a pivot 6 as a rotation axis. A controller (not shown) swings the carriage arm 5 by a voice coil motor (VCM) 7 so that the magnetic head 2 is positioned on a desired track with respect to a rotating magnetic disk 1 to perform write and read of information.

Figure 2:
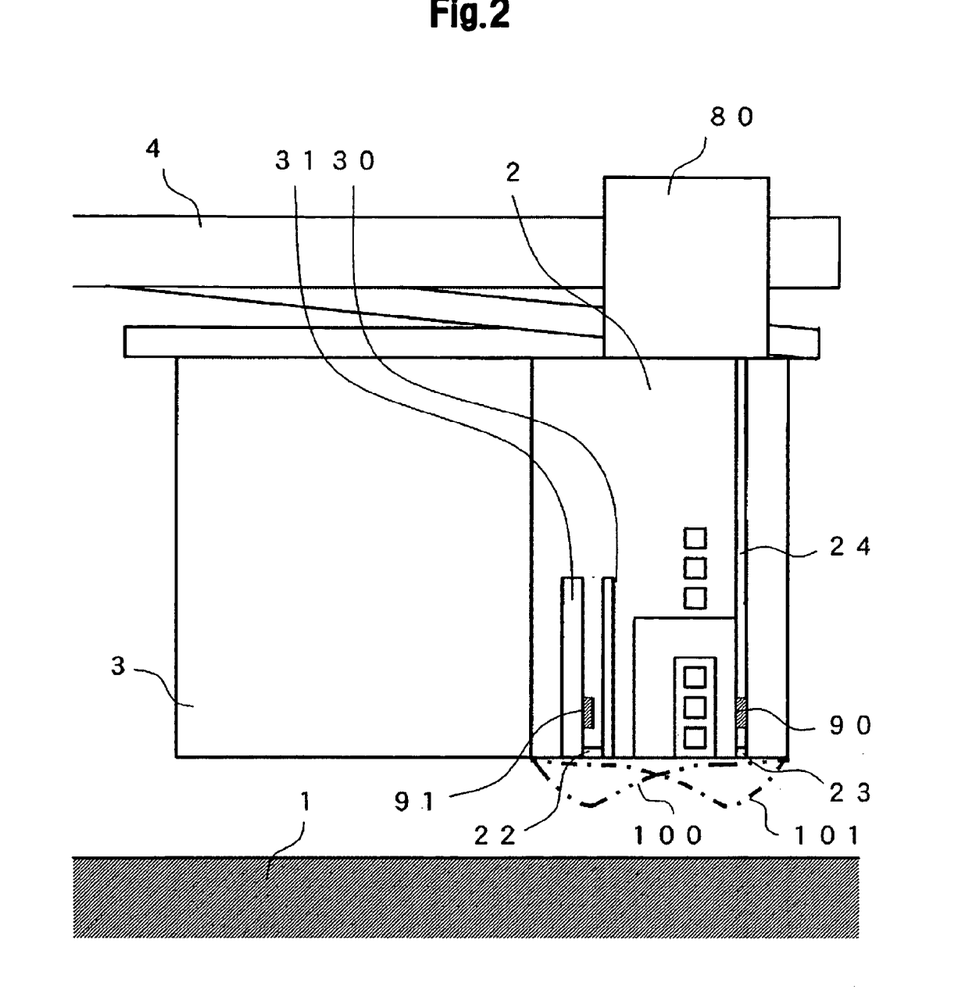
FIG. 2 is an exemplary section view showing a configuration of example 1 of an embodiment of the invention.

Example 1 of flying height adjustment of a magnetic head is described using FIG. 2.

FIG. 2 shows a longitudinal section view of a portion near the slider 3 of a head/suspension assembly using the example 1. A lens (not shown) is disposed at a side of a laser module 80 emitting laser light having at least two wavelengths, or at a side of the magnetic head 2. The laser module 80 emits laser light having infrared wavelengths X and Y transparent to Al2O3 being a main material of the magnetic head 2 according to an instruction from the controller.

A light absorbing member 90, which is provided near a write element including a write pole 20 and a coil 21 in the magnetic head 2, is configured by a material that transmits light having the wavelength X, and absorbs light having the wavelength Y and converts the light into heat. A light absorbing member 91, which is provided near a read element 22 interposed between a first shield 30 and a second shield 31 compared with the light absorbing member 90, is configured by a material that transmits the light having the wavelength Y, and absorbs the light having the wavelength X and converts the light into heat. In addition, a member that easily thermally expands is disposed (not shown) around each of the light absorbing members 90 and 91, thereby each of the light absorbing members 90 and 91 may be efficiently projected.

As an example of the light absorbing members 90 and 91 used in the embodiment, metal having a blackened surface is given in case of using laser light having a wavelength of several hundred nanometers, and ceramics are given in case of using laser light having a wavelength of more than several hundred nanometers. The member that easily thermally expands indicates a member having a high linear expansion coefficient, and aluminum is given as an example of the member used in the embodiment.

In case that the laser light having the wavelength Y is irradiated from the laser module 80, the laser light is absorbed by the light absorbing member 90 and converted into heat therein. The light absorbing member 90 generates heat and thus the magnetic head expands, so that a flying surface (surface at a side opposed to the magnetic disk 1) projects at a region including a tip of the write pole 20 as seen by a chain line 101 shown in FIG. 2.

In case that the laser light having the wavelength X is irradiated from the laser module 80, the laser light is absorbed by the light absorbing member 91 and converted into heat therein. The light absorbing member 91 generates heat, thereby a region near the read element 22 expands, so that a flying surface projects at a region near the read element 22 as seen by a two-dot chain line 100 shown in FIG. 2. Therefore, the controller controls the laser module 80 so that the module irradiates the laser light having the wavelength Y in case that information is written into the magnetic disk 1, and irradiates the laser light having the wavelength X in case that information is read from the magnetic disk 1. The laser module 80 itself may determine which wavelength laser light is irradiated depending on write or read.

A waveguide 24 is formed from the laser module 80 to the region near the write element, and part of the irradiated laser light is guided into the waveguide 24, and irradiated to an external magnetic disk 1 from a near-field light generating element 23 disposed at a tip of the waveguide 24. Thus, the magnetic head may be used even for thermally assisted magnetic recording. The light absorbing member 90 is not disposed near the write element, and only the light absorbing member 91 is provided in a read element portion, thereby light irradiated to a write element side may be designed to be used only for thermal assist.

According to the example, multiple-wavelength laser is used, and the controller changes a wavelength of laser light irradiated from the laser module 80, thereby a write element portion and a read element 22 portion may be selectively projected. Moreover, laser power at each wavelength is controlled, thereby a projecting distance may be adjusted. Moreover, it may be designed that the write element is projected using a phenomenon that the write element expands by heat generated by the coil 21, and only the read element 22 is projected using light.

In the example, the laser module 80 is disposed on the magnetic head 2. However, the laser module 80 may be disposed within the magnetic head 2, or may be disposed in a place away from the slider 3.

In the example, the light absorbing member 90 is provided within the waveguide 24. However, the member may be provided in any place within the magnetic head 2, if the member 91 is located at a position near the write element compared with the light absorbing member 91 that projects the read element 22. Moreover, a reflective plate may be used in place of the lens to concentrate laser light onto the light absorbing member.

In the example, the waveguide 24 is provided at an outflow end side of the write element to prevent a distance between the write element and the read element 22 from increasing due to skew. However, to make much of increasing an effect of thermal assist, the waveguide 24 may be provided at an inflow end side of the write element, that is, may be provided between the write element and the read element 22. Furthermore, the near-field light generating element 23, which obliquely irradiates laser light to a flying surface, is used, and the waveguide 24 is provided while being displaced in a width direction of the magnetic head 2, thereby the waveguide 24 may be provided at an inflow end side of the write element without increasing a distance between the write element and the read element 22 due to skew.

EXAMPLE 2

Figure 3:
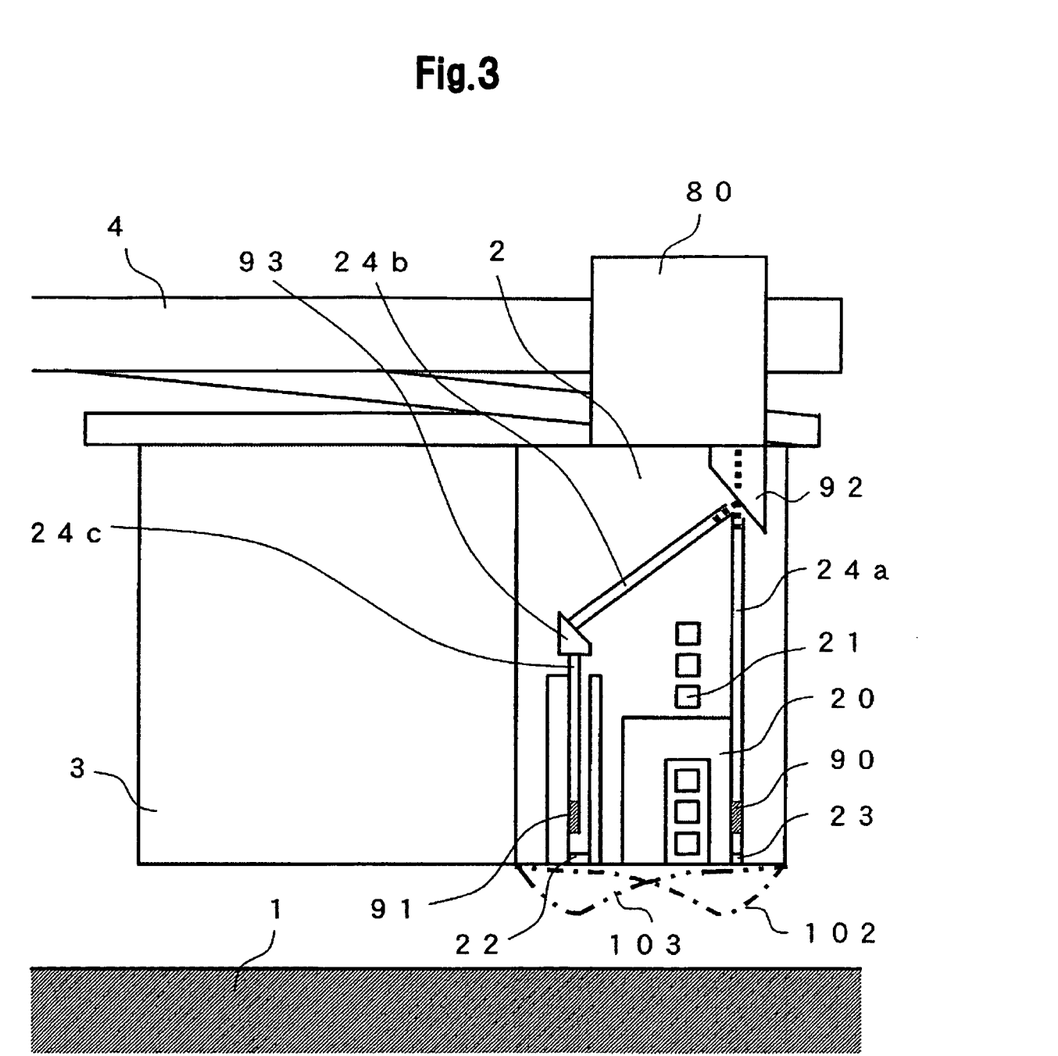
FIG. 3 is an exemplary section view showing a configuration of example 2 of an embodiment of the invention.

Example 2 of flying height adjustment of a magnetic head is described using FIG. 3.

FIG. 3 shows a longitudinal section view of a portion near a slider 3 of a head/suspension assembly using the example 2. Laser light, which is emitted from a laser module 80 as a light source emitting laser light having two different wavelengths, passes through a prism 92 as a spectroscope, and is guided into a waveguide 24a or a waveguide 24b depending on a wavelength of irradiated laser light.

Laser light guided into the waveguide 24a reaches a light absorbing member 90 disposed near a write element including a write pole 20 and a coil 21 in a magnetic head 2, and converted into heat therein. The light absorbing member 90 generates heat, thereby a region near the write element expands, so that a flying surface projects at a tip of the write pole 20 as seen by a chain line 102 shown in FIG. 3.

Laser light guided into the waveguide 24b passes through a prism 93 and a waveguide 24c provided between a first shield and a second shield, and reaches a light absorbing member 91 disposed near a read element 22 in the magnetic head 2, and converted into heat therein. The light absorbing member 91 generates heat, thereby a region near the read element 22 expands, so that the flying surface projects at a region near the read element 22 as seen by a two-dot chain line 103 shown in FIG. 3.

A member that easily generates thermal expansion is disposed around each of the light absorbing members 90 and 91, so that the relevant portion may be efficiently projected.

According to the example, multiple-wavelength laser is used, and a controller changes a wavelength of laser light irradiated from the laser module 80 depending on write or read, thereby a write element portion and a read element 22 portion may be selectively projected. Moreover, laser power at each wavelength is controlled, thereby a projecting distance may be adjusted. Moreover, the prism is disposed in an appropriate place, thereby a degree of freedom of a setting position of each light absorbing member is increased, and furthermore an optional region may be projected.

As the multiple wavelengths, three wavelengths may be used, including a wavelength X being absorbed by the light absorbing member 90 for projecting the write element, a wavelength Y being absorbed by the light absorbing member 91 for projecting the read element 22, and a wavelength Z for thermal assist, which is not absorbed by the light absorbing member 90 and is irradiated from the near-field light generating element 23. Alternatively, when it is configured that laser light being not absorbed by the light absorbing member 90 is irradiated from the near-field light generating element 23 and used for thermally assisted magnetic recording, two wavelengths may be used, including a wavelength X' for combined use of projecting the write element and thermal assist, and a wavelength Y' for projecting the read element 22.

When it is designed that the waveguide 24a is allowed to penetrate to the flying surface, and the near-field light generating element 23 is disposed at a tip of the waveguide, and laser light having a wavelength being transmitted by the light absorbing member 90 may be emitted from the laser module 80, combined use with thermally assisted magnetic recording is enabled. On the other hand, the waveguide 24b is desirably not allowed to penetrate to the flying surface to prevent laser light from being irradiated to a disk.

In the example, the laser module 80 is disposed on the magnetic head 2. However, the laser module 80 may be disposed within the magnetic head 2, or may be disposed in a place away from the slider 3. It is also acceptable that the laser module 80 does not control a wavelength depending on an element to be projected, but the module constantly emits laser having multiple wavelength, and a filter that transmits only light having the wavelength X and a filter that transmits only light having the wavelength Y are provided in waveguides between the laser module 80 and the light absorbing members respectively, and the controller changes ON/OFF between the filters, so that a region near an element at an optional side is projected. Alternatively, it is acceptable that a filter that transmits only light having the wavelength Y is provided in place of the prism 92, and light having other wavelengths reflected by the filter are guided into the light absorbing member 90, so that the wavelength X is used to expand the region near the write element, and a wavelength different from the wavelength X is used to perform thermally assisted magnetic recording.

In the example, the prism 93 is used to guide laser light from the waveguide 24b into the waveguide 24c. However, an optical element such as a mirror may be used, or the waveguide 24b may be directly connected to the waveguide 24c with some curvature. In case that the optical element is used for the spectroscope, a projecting distance of each of the write element and the read element 22 may be individually controlled even if a single wavelength is used, or two wavelengths may be used for a combined use of element projection and thermally assisted magnetic recording.

It may be configured that the light absorbing member 90 is not disposed near the write element, and only the light absorbing member 91 is provided in a read element region, thereby light irradiated at a write element side is used only for thermal assist.

EXAMPLE 3

Figure 4:
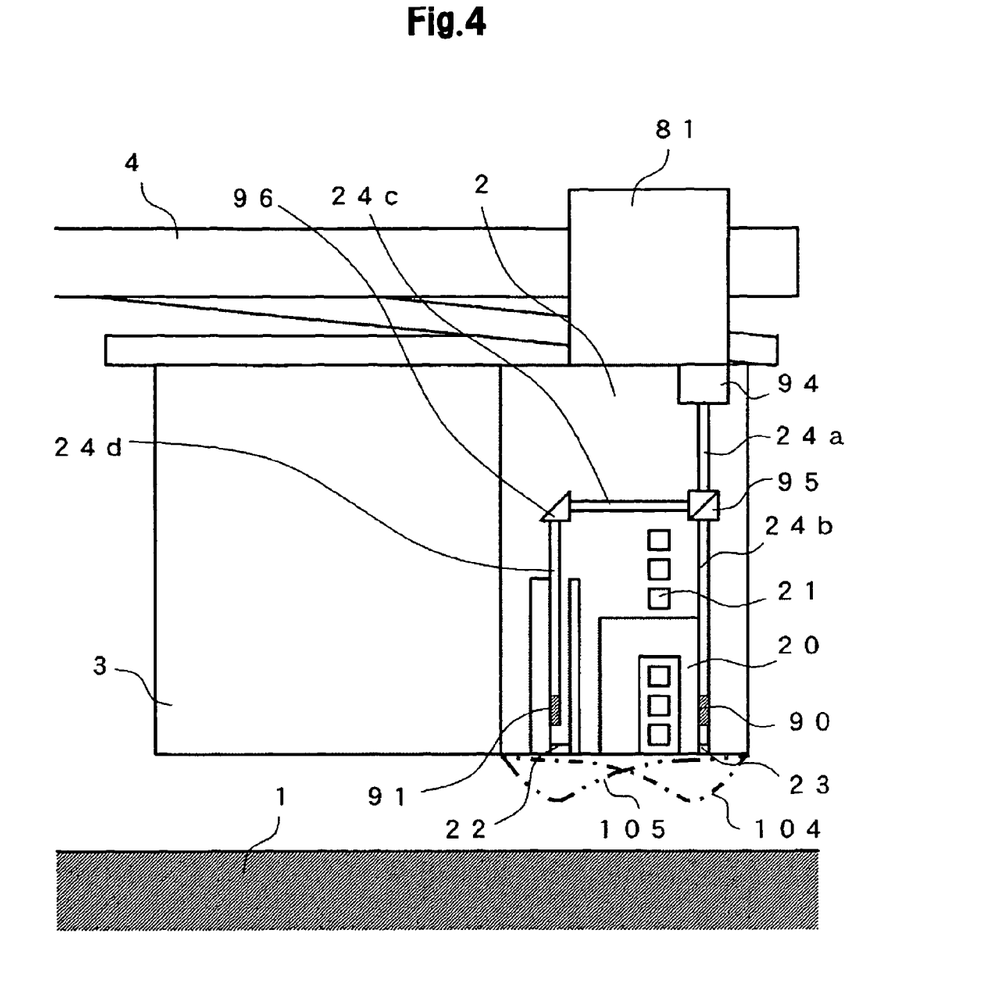
FIG. 4 is an exemplary section view showing a configuration of example 3 of an embodiment of the invention.

Example 3 of flying height adjustment of a magnetic head is described using FIG. 4.

FIG. 4 shows a longitudinal section view of a portion near a slider 3 of a head/suspension assembly using the example 3. Laser light emitted from a laser diode 81 as a light source passes through a crystal cell 94 as a polarization conversion element and a waveguide 24a, and reaches a polarization beam splitter 95. In the specification, the laser diode refers to a device emitting laser light having a single wavelength, and the laser module refers to a device emitting laser light having at least two wavelengths.

When a controller changes between ON and OFF of the crystal cell 94, polarization (p-polarization and s-polarization) of laser light that reaches the polarizing beam splitter 95 is changed, and the laser light is guided into a waveguide 24b or a waveguide 24c depending on the polarization.

Laser light guided into the waveguide 24b reaches a light absorbing member 90 disposed near a write element including a write pole 20 and a coil 21 in a magnetic head 2, and converted into heat therein. The light absorbing member 90 generates heat, thereby a region near the write element expands, so that a flying surface projects at a tip of the write pole 20 as seen by a chain line 104 shown in FIG. 4.

Laser light guided into the waveguide 24c passes through a prism 96 and a waveguide 24d, and reaches a light absorbing member 91 disposed near a read element 22 in the magnetic head 2, and converted into heat therein. The light absorbing member 91 generates heat, thereby a region near the read element 22 expands, so that the flying surface projects at a region near the read element 22 as seen by a two-dot chain line 105 shown in FIG. 4.

A member that easily generates thermal expansion is disposed around each of the light absorbing members 90 and 91, so that the relevant portion may be efficiently projected.

According to the example, the controller changes between ON and OFF of the crystal cell 94 depending on write or read, thereby a write element portion and a read element portion may be selectively projected using a short wavelength laser. Moreover, input power of the laser diode 81 is controlled, thereby a projecting distance may be adjusted. A polarized filter may be provided at a light source side of each of the light absorbing members 90 and 91 in place of the polarizing beam splitter 95.

Moreover, a filter that transmits or cuts off a particular wavelength is provided at the light source side of each of the light absorbing members 90 and 91, and a laser module that emits laser light having two different wavelengths is used in place of the laser diode 81, thereby one of the element portions may be selectively projected.

Alternatively, a near-field light generating element 23 is disposed at a tip of the waveguide 24b, and a laser module that emits laser light having two different wavelengths is used in place of the laser diode 81, and laser light having one wavelength is absorbed by the light absorbing member 90 or 91, and laser light having the other wavelength is transmitted by the light absorbing member 90, which enables combined use with thermally assisted magnetic recording.

In the example, the waveguide 24a, waveguide 24b, waveguide 24c and waveguide 24d are formed in the magnetic head 2. However, for example, a lens is disposed at a laser module 80 side or a magnetic head 2 side, and laser light having an infrared wavelength is used, the wavelength being transparent to Al2O3 being a main material of the magnetic head 2, thereby the same effect may be obtained even if the waveguide 24a, waveguide 24b, and waveguide 24c are not provided.

In the example, the laser diode 81 is disposed on the magnetic head 2. However, the laser diode 81 may be disposed within the magnetic head 2, or may be disposed in a place away from the slider 3.

EXAMPLE 4

Figure 5:
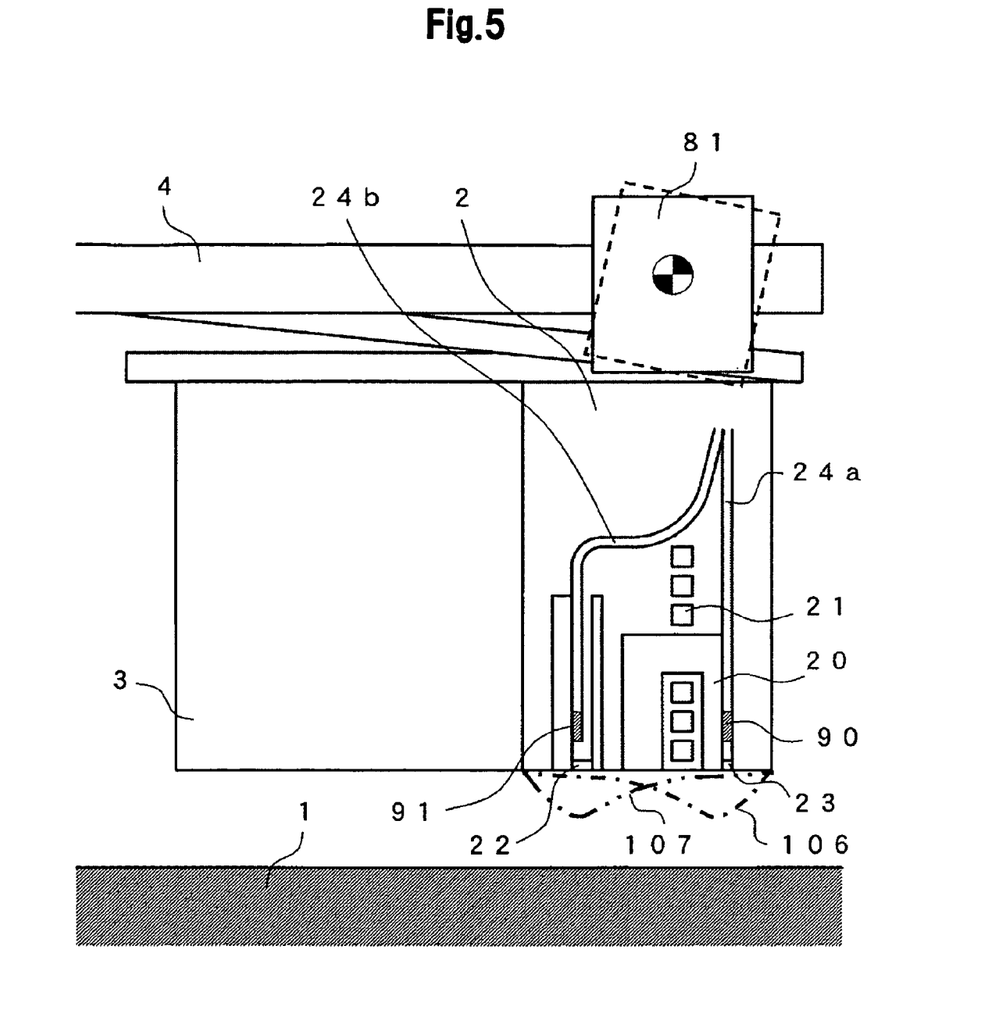
FIG. 5 is an exemplary section view showing a configuration of example 4 of an embodiment of the invention.

Example 4 of flying height adjustment of a magnetic head is described using FIG. 5.

FIG. 5 shows a longitudinal section view of a portion near a slider 3 of a head/suspension assembly using the example 4. A controller swings a laser diode 81, thereby laser light emitted from the laser diode 81 is guided into a waveguide 24a or a waveguide 24b.

Laser light guided into the waveguide 24a reaches a light absorbing member 90 disposed near a write element including a write pole 20 and a coil 21 in a magnetic head 2, and converted into heat therein. The light absorbing member 90 generates heat, thereby a region near the write element expands, so that a flying surface projects at a tip of the write pole 20 as seen by a chain line 106 shown in FIG. 5.

Laser light guided into the waveguide 24b reaches a light absorbing member 91 disposed near a read element 22 in the magnetic head 2, and converted into heat therein. The light absorbing member 91 generates heat, thereby a region near the read element 22 expands, so that the flying surface projects at a region near the read element 22 as seen by a two-dot chain line 107 shown in FIG. 5.

A member that easily generates thermal expansion is disposed around each of the light absorbing members 90 and 91, so that the relevant portion may be efficiently projected.

According to the example, the laser diode 81 is swung, thereby a read element portion and a write element 22 portion may be selectively projected. Moreover, a projecting distance may be adjusted by controlling laser power.

Alternatively, a near-field light generating element 23 is disposed at a tip of the waveguide 24a, and a laser module that emits laser light having two different wavelengths is used in place of the laser diode 81, and laser light having one wavelength is absorbed by the light absorbing member 90 or 91, and laser light having the other wavelength is transmitted by the light absorbing member 90, which enables combined use with thermally assisted magnetic recording.

In the example, the waveguide 24a and waveguide 24b are formed in the magnetic head 2. However, for example, a lens is disposed at a laser diode 81 side or a magnetic head 2 side, and laser light having an infrared wavelength is used, the wavelength being transparent to Al2O3 being a main material of the magnetic head 2, thereby the same effect may be obtained even if the waveguide 24a and waveguide 24b are not provided.

In the example, the laser diode 81 is disposed on the magnetic head 2. However, the laser diode 81 may be disposed within the magnetic head 2, or may be disposed in a place away from the slider 3.

In the example, laser light is guided to the light absorbing member 91 by the waveguide 24b having a curved portion. However, the laser light may be guided using a linear waveguide and an optical element such as a mirror or prism.

In the example, the laser diode 81 is swung. However, even if the laser diode is straightly moved, the same effect may be obtained.

EXAMPLE 5

Figure 6:
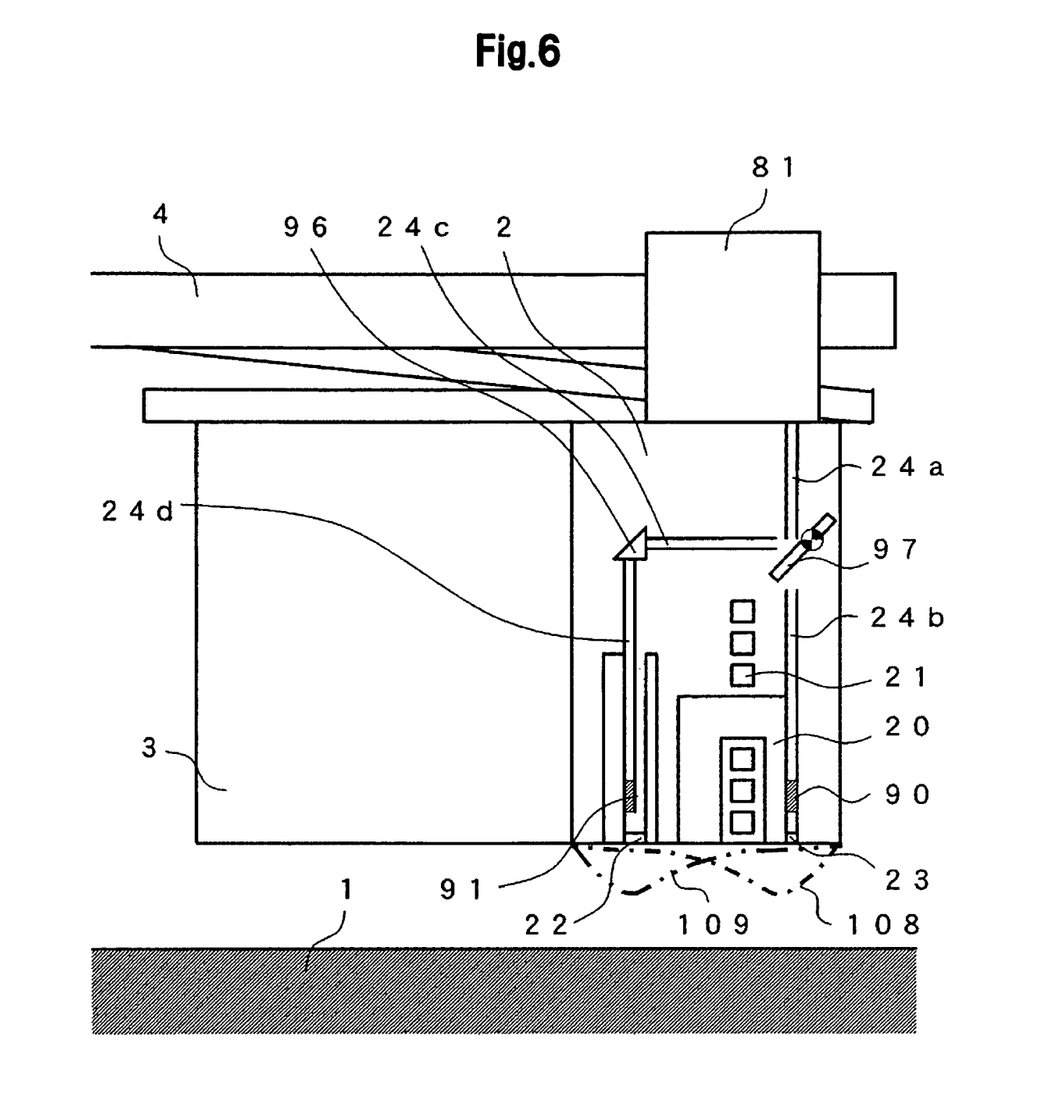
FIG. 6 is an exemplary section view showing a configuration of example 5 of an embodiment of the invention.

Example 5 of flying height adjustment of a magnetic head is described using FIG. 6.

FIG. 6 shows a longitudinal section view of a portion near a slider 3 of a head/suspension assembly using the example 5. Laser light emitted from a laser diode 81 reaches a movable mirror 97 through a waveguide 24a.

A controller swings the movable mirror 97, thereby the laser light is guided into a waveguide 24b or a waveguide 24c.

Laser light guided into the waveguide 24b reaches a light absorbing member 90 disposed near a write element including a write pole 20 and a coil 21 in a magnetic head 2, and converted into heat therein. The light absorbing member 90 generates heat, thereby a region near the write element expands, so that a flying surface projects at a tip of the write pole 20 as seen by a chain line 108 shown in FIG. 6.

Laser light guided into the waveguide 24c passes through a mirror 98 and a waveguide 24d, and reaches a light absorbing member 91 disposed near a read element 22 in the magnetic head 2, and converted into heat therein. The light absorbing member 91 generates heat, thereby a region near the read element 22 expands, so that the flying surface projects at a region near the read element 22 as seen by a two-dot chain line 109 shown in FIG. 6.

A member that easily generates thermal expansion is disposed around each of the light absorbing members 90 and 91, so that the relevant portion may be efficiently projected.

According to the example, the movable mirror 97 is swung, thereby a write element portion and a read element portion may be selectively projected. Moreover, input power of the laser diode 81 is controlled, thereby a projecting distance may be adjusted.

Alternatively, a near-field light generating element 23 is disposed at a tip of the waveguide 24b, and a laser module that emits laser light having two different wavelengths is used in place of the laser diode 81, and laser light having one wavelength is absorbed by the light absorbing members 90 and 91, and laser light having the other wavelength is transmitted by the light absorbing member 90, which enables combined use with thermally assisted magnetic recording.

In the example, the waveguide 24a, waveguide 24b, waveguide 24c and waveguide 24d are formed in the magnetic head 2. However, for example, a lens is disposed at a laser diode 81 side or a magnetic head 2 side, and laser light having an infrared wavelength is used, the wavelength being transparent to Al2O3 being a main material of the magnetic head 2, thereby the same effect may be obtained even if the waveguide 24a, waveguide 24b, and waveguide 24c are not provided.

In the example, the laser diode 81 is disposed on the magnetic head 2. However, the laser diode 81 may be disposed within the magnetic head 2, or may be disposed in a place away from the slider 3.

In the example, the waveguide 24c and the waveguide 24d are connected via the mirror 98. However, the waveguide 24c and the waveguide 24d may be directly curvedly connected to each other.

In the example, the movable mirror 97 is swung. However, even if the movable mirror is straightly moved, the same effect may be obtained.

EXAMPLE 6

Figure 7:
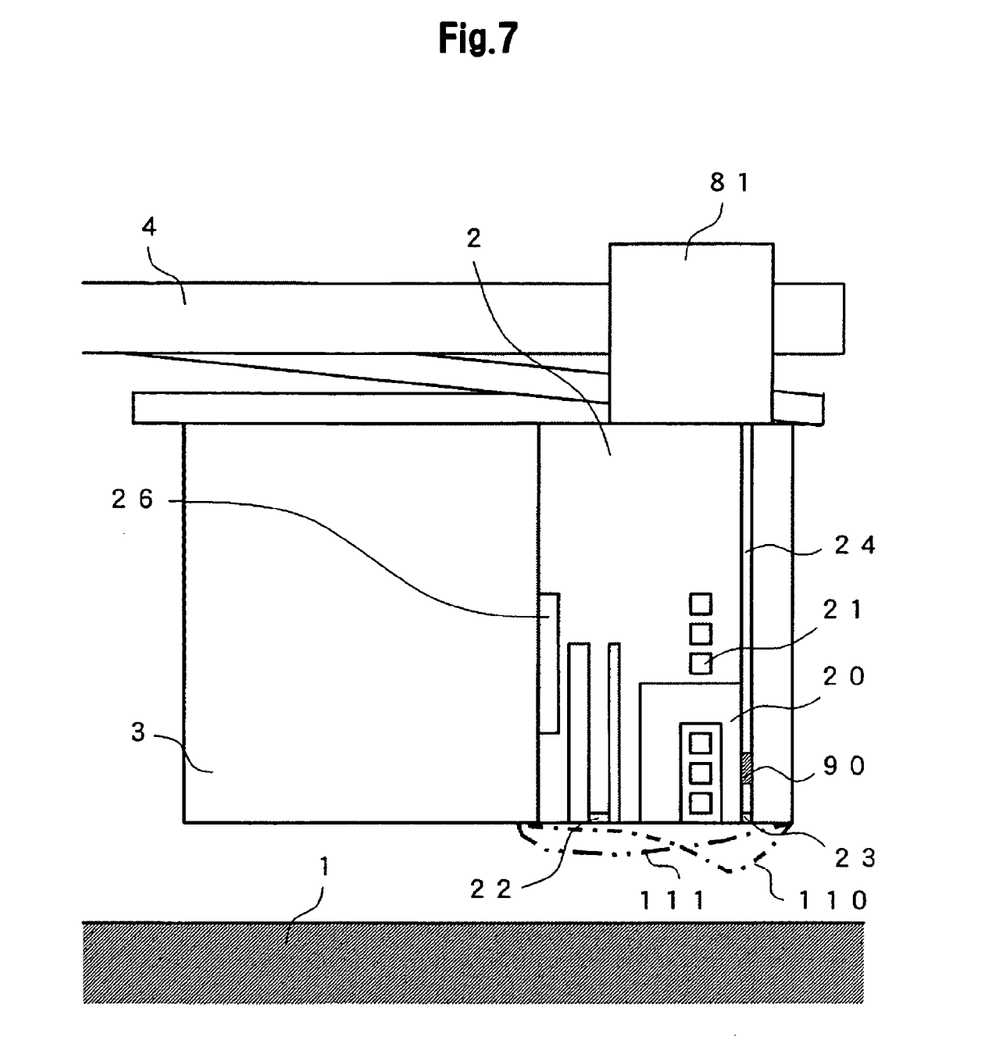
FIG. 7 is an exemplary section view showing a configuration of example 6 of an embodiment of the invention.

Example 6 of flying height adjustment of a magnetic head is described using FIG. 7.

FIG. 7 shows a longitudinal section view of a portion near a slider 3 of a head/suspension assembly using the example 6. Laser light irradiated from a laser diode 81 reaches a light absorbing member 90 through a waveguide 24 formed near a write element including a write pole 20 and a coil 21 in a magnetic head 2, and absorbed by the light absorbing member and converted into heat therein.

The light absorbing member 90 generates heat, thereby the magnetic head 2 expands, so that a flying surface projects at a tip of the write pole as seen by a chain line 110 shown in FIG. 7.

On the other hand, a controller applies a current into a coil 26 in the magnetic head and thus allows the coil to generate heat, thereby the magnetic head 2 expands, so that the flying surface projects at a region including a read element 22 and the tip of the write pole as seen by a two-dot chain line 111 shown in FIG. 7.

A member that easily generates thermal expansion is disposed around each of the light absorbing member 90 and the coil 26, so that the relevant portion may be efficiently projected.

According to the example, the controller changes between emission of the laser diode 81 and current application into the coil 26, thereby a write element portion and a read element portion may be selectively projected. Moreover, the controller controls laser power and a current inputted into the coil 26, thereby a projecting distance may be adjusted.

Alternatively, a near-field light generating element 23 is disposed at a tip of the waveguide 24, and a laser module that emits laser light having two different wavelengths is used in place of the laser diode 81, and laser light having one wavelength is absorbed by the light absorbing member 90, and laser light having the other wavelength is transmitted by the light absorbing member 90, which allows combined use with thermally assisted magnetic recording.

In the example, the waveguide 24 is formed in the magnetic head 2. However, for example, a lens is disposed at a laser diode 81 side or a magnetic head 2 side, and laser light having an infrared wavelength is used, the wavelength being transparent to Al2O3 being a main material of the magnetic head 2, thereby the same effect may be obtained even if the waveguide 24 is not provided.

In the example, the laser diode 81 is disposed on the magnetic head 2. However, the laser diode 81 may be disposed within the magnetic head 2, or may be disposed in a place away from the slider 3.

EXAMPLE 7

Figure 8:
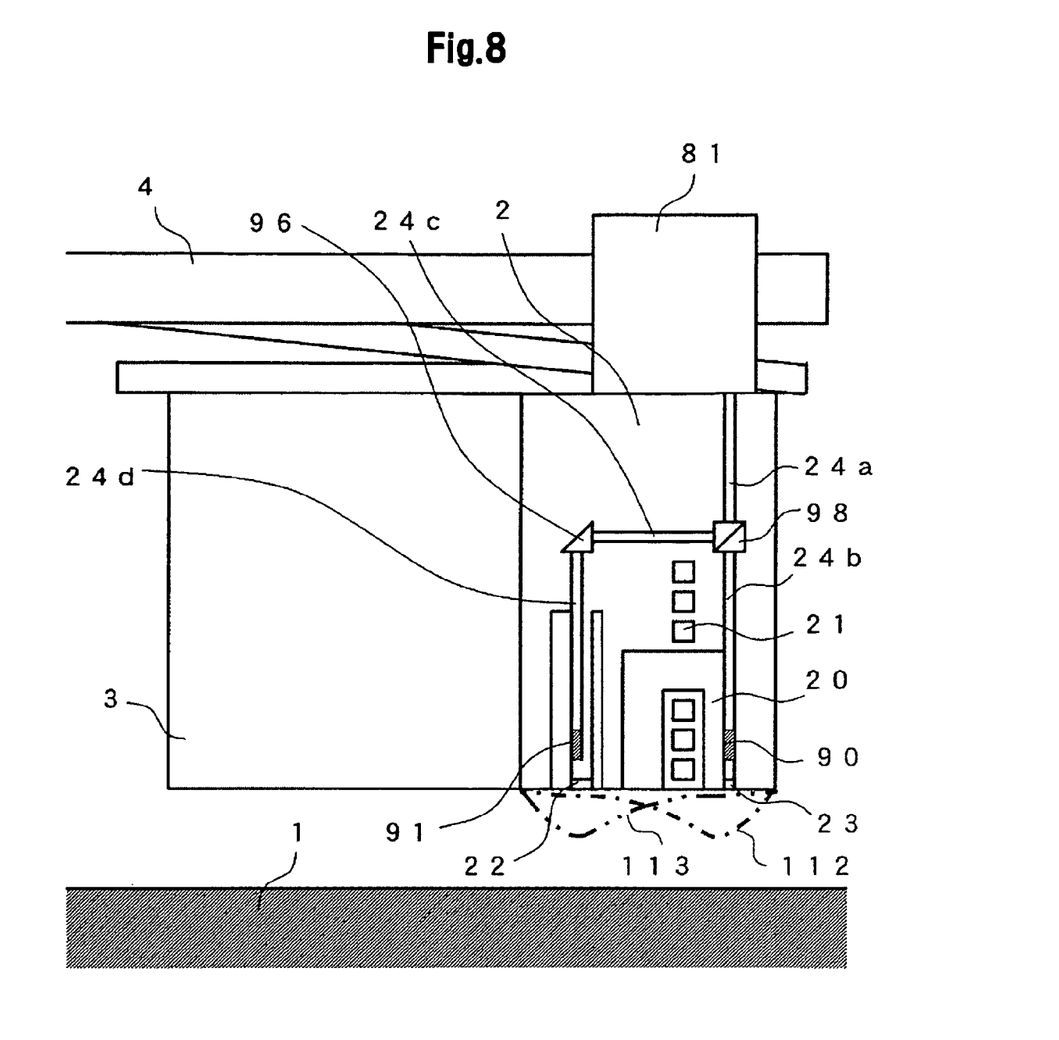
FIG. 8 is an exemplary section view showing a configuration of example 7 of an embodiment of the invention.

Example 7 of flying height adjustment of a magnetic head is described using FIG. 8.

FIG. 8 shows a longitudinal section view of a portion near a slider 3 of a head/suspension assembly using the example 7. Laser light emitted from a laser diode 81 reaches a beam splitter 98.

A beam splitter has a transmission/reflection layer in the inside thereof, so that laser light that reaches the beam splitter 98 is partially guided into a waveguide 24b, and the rest of the laser light is guided into a waveguide 24c. A ratio of transmission of the transmission/reflection layer is optionally set, thereby a ratio between laser light guided into the waveguides 24b and 24c may be set to an optional value.

Laser light guided into the waveguide 24b reaches a light absorbing member 90 disposed near a write element including a write pole 20 and a coil 21 in a magnetic head 2, and converted into heat therein. The light absorbing member 90 generates heat, thereby a region near the write element expands, so that a flying surface projects at a tip of the write pole 20 as seen by a chain line 112 shown in FIG. 8.

Laser light guided into the waveguide 24c passes through a mirror 96 and a waveguide 24d, and reaches a light absorbing member 91 disposed near a read element 22 in the magnetic head 2, and converted into heat therein. The light absorbing member 91 generates heat, thereby a region near the read element 22 expands, so that the flying surface projects at a region near the read element 22 as seen by a two-dot chain line 113 shown in FIG. 8.

A member that easily generates thermal expansion is disposed around each of the light absorbing members 90 and 91, so that the relevant portion may be efficiently projected.

According to the example, input power of the laser diode 81 is controlled, thereby a projecting distance may be adjusted.

Alternatively, a near-field light generating element 23 is disposed at a tip of the waveguide 24b, and a laser module that emits laser light having two different wavelengths is used in place of the laser diode 81, and laser light having one wavelength is absorbed by the light absorbing member 90 or 91, and laser light having the other wavelength is transmitted by the light absorbing member 90, which enables combined use with thermally assisted magnetic recording.

In the example, the waveguide 24a, waveguide 24b, waveguide 24c and waveguide 24d are formed in the magnetic head 2. However, for example, a lens is disposed at a laser diode 81 side or a magnetic head 2 side, and laser light having an infrared wavelength is used, the wavelength being transparent to Al2O3 being a main material of the magnetic head 2, thereby the same effect may be obtained even if the waveguide 24a, waveguide 24b, waveguide 24c and waveguide 24d are not provided.

In the example, the laser diode 81 is disposed on the magnetic head 2. However, the laser diode 81 may be disposed within the magnetic head 2, or may be disposed in a place away from the slider 3.

In the example, the waveguide 24c and the waveguide 24d are connected via the mirror 98. However, the waveguide 24c and the waveguide 24d may be directly curvedly connected.

EXAMPLE 8

Figure 9:
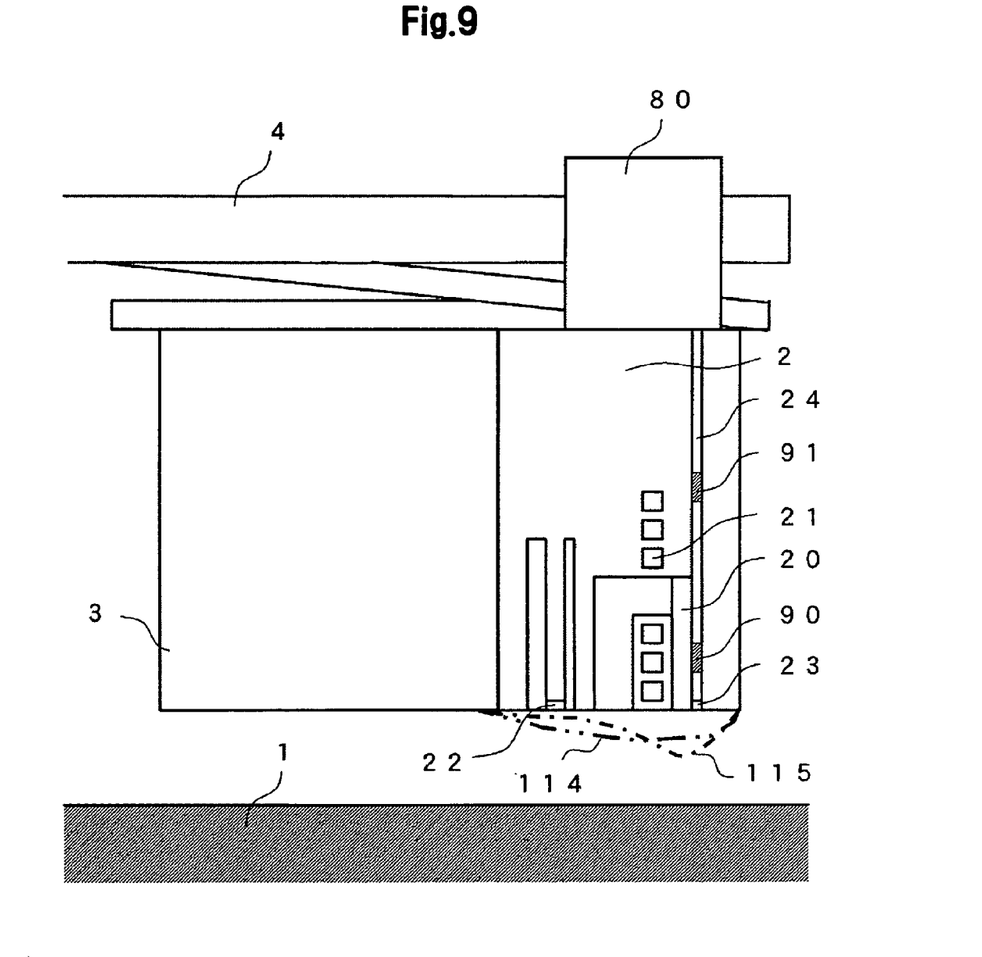
FIG. 9 is an exemplary section view showing a configuration of example 8 of an embodiment of the invention.

Example 8 of flying height adjustment of a magnetic head is described using FIG. 9.

FIG. 9 shows a longitudinal section view of a portion near a slider 3 of a head/suspension assembly using the example 8. Laser light emitted from a laser module 80 as a light source emitting laser light having a wavelength X and a wavelength Y passes through a waveguide 24 formed near a write element including a write pole 20 and a coil 21 in a magnetic head 2, and reaches a light absorbing member 90 that transmits light having the wavelength Y, and absorbs light having the wavelength X and converts the light into heat, and a light absorbing member 91 that transmits the light having the wavelength X, and absorbs the light having the wavelength Y and converts the light into heat. Since data are written into a region being heated by laser light emitted from a near-field light generating element 23 while a magnetic field is applied to the region, the write element and the near-field light generating element 23 are desirably located close to each other. Therefore, in FIG. 9, the write pole 20 contacts to the waveguide 24. From this viewpoint, while processing is difficult, the waveguide 24 may be provided within the write pole 20. On the other hand, from a viewpoint of light loss, the write pole 20 is desirably away from the waveguide 24.

In case that a controller allows the laser light having the wavelength X to be irradiated from the laser module, the laser light is transmitted by the light absorbing member 91, and absorbed by the light absorbing member 90 and converted into heat therein. The light absorbing member 90 generates heat and thus the magnetic head expands, so that a flying surface (surface at a side opposed to the magnetic disk 1) projects at a tip of the write pole as seen by a chain line 115 shown in FIG. 9.

In case that the controller allows the laser light having the wavelength Y to be irradiated from the laser module, the laser light is absorbed by the light absorbing member 91 and converted into heat therein. The light absorbing member 91 generates heat and thus the magnetic head expands, so that the flying surface (surface at the side opposed to the magnetic disk 1) projects at a region including a read element 22 and the tip of the write pole 20 as seen by a two-dot chain line 114 shown in FIG. 9.

A member that easily generates thermal expansion is disposed around each of the light absorbing members 90 and 91, so that the relevant portion may be efficiently projected.

According to the example, multiple-wavelength laser is used, and a wavelength of laser light irradiated from the laser module 80 is changed, thereby a write element portion and a read element portion may be selectively projected. Moreover, laser power at each wavelength is controlled, thereby a projecting distance may be adjusted.

The waveguide 24 is allowed to penetrate to the flying surface, and the near-field light generating element 23 is disposed at a tip of the waveguide, and laser light having a wavelength that is transmitted by each of the light absorbing members 90 and 91 is emitted from the laser module 80, which enables combined use with thermally assisted magnetic recording.

In the example, the laser module 80 is disposed on the magnetic head 2. However, the laser module 80 may be disposed within the magnetic head 2, or may be disposed in a place away from the slider 3.

In each example, depending on write or read, a controller changes a wavelength of light irradiated from the laser module 80 or the laser diode 81, changes ON/OFF of the crystal cell 94, swings the laser diode 81, swings the movable mirror 97, or changes between emission of the laser diode 81 and current application to the coil 26. However, it is also acceptable that the laser module 80 or laser diode 81, the crystal cell 94, the movable mirror 97, or the coil 26 personally receives an instruction and thus determines whether write or read is to be performed, so that it personally performs the change operation or the like.

What is claimed is:

1. A head slider comprising:
   a write element,
   a read element,
   a light absorbing member provided between the write element and the read element, and closer to the read element than to the write element, and
   a light source configured to irradiate light to the light absorbing member.

2. The head slider according to claim 1, further comprising a waveguide that guides light from the light source into the light absorbing member.

3. The head slider according to claim 1, further comprising:
   a light generating element configured to irradiate light from the light source to the outside of the head slider, and
   a second waveguide configured to guide the light from the light source into the light generating element.

4. The head slider according to claim 1, further comprising:
   a waveguide configured to guide light from the light source into the light absorbing member,
   a light generating element configured to irradiate light from the light source to the outside of the head slider,
   a second waveguide configured to guide the light from the light source into the light generating element, and
   a second light absorbing member provided in the second waveguide.

5. The head slider according to claim 4,
   wherein the light source irradiates light having multiple wavelengths selectively or simultaneously, and
   the light absorbing member and the second light absorbing member are configured by members absorbing light having different wavelengths from each other.

6. The head slider according to claim 4,
   wherein a polarization conversion element that changes polarization of the light, and a polarization spectroscopic element that changes between transmission and reflection of light depending on polarization are provided between the light source, and the light absorbing member and the second light absorbing member respectively, and
   the polarization is changed so that the light is irradiated to one of the light absorbing members.

7. The head slider according to claim 4, wherein the light source is moved, thereby the light is irradiated to one of the light absorbing member and the second light absorbing member.

8. The head slider according to claim 4,
wherein a movable mirror is provided between the light source and, the light absorbing member and the second light absorbing member, and
the movable mirror is moved, thereby the light is irradiated to one of the light absorbing members.

9. The head slider according to claim 1, wherein a coil is provided between the read element and the write element and closer to the read element than the write element.

10. The head slider according to claim 1, wherein the light is laser light having an infrared wavelength.

11. The head slider according to claim 4, wherein a part of light guided into the second waveguide is absorbed by the second light absorbing member, and the rest of the light is irradiated to the outside of the head slider.

12. A disk drive comprising:
a medium to be written with information,
a head slider having,
a write element configured to write information into the medium,
a read element configured to read information written in the medium, and
a light absorbing member provided between the write element and the read element, nearer to the read element than the write element,
a light source configured to irradiates light to the light absorbing member, and
a controller configured to position the head slider on the medium, and allows information to be written into the medium, and allows information to be read from the medium, and controls the light source.

13. The disk drive according to claim 12, wherein the head slider includes:
a first waveguide configured to connect the light source to the light absorbing member, and
a second waveguide provided between the write element and the read element and closer to the write element than the read element.

14. The disk drive according to claim 13,
wherein the head slider includes a spectroscope that guides the light into the first waveguide or the second waveguide depending on a wavelength, and
when information is read from the disk, the controller allows light having a wavelength and being guided into the first waveguide by the spectroscope, to be irradiated from the light source.

15. The disk drive according to claim 14,
wherein the light source irradiates light having first, second and third wavelengths,
the light absorbing member is configured by a member absorbing light having the first wavelength,
the second waveguide penetrates to a surface at a side of the medium of the head slider, and includes a second light absorbing member including a member that absorbs light having the second wavelength, and transmits light having the third wavelength,
the spectroscope guides the light having the first wavelength into the first waveguide, and guides the light having the second and third wavelengths into the second waveguide, and
when information is written into the disk, the controller allows the light having the second and third wavelengths to be irradiated from the light source.

16. The disk drive according to claim 14,
wherein the light source irradiates light having first and second wavelengths,
the light absorbing member is configured by a member absorbing light having the first wavelength,
the second waveguide penetrates to a surface at a side of the medium of the head slider, and includes a second light absorbing member including a member that absorbs a part of light having the second wavelength, and transmits another part of the light,
the spectroscope guides the light having the first wavelength into the first waveguide, and guides the light having the second wavelength into the second waveguide, and
when information is written into the disk, the controller allows the light having the second wavelength to be irradiated from the light source.

17. The disk drive according to claim 14, wherein the head slider includes
a polarization conversion element that changes polarization of the light, and a polarization spectroscopic element that guides light into the first waveguide or the second waveguide depending on polarization, the polarization conversion element and the polarization spectroscopic element being provided between the light source, and the first waveguide and the second waveguide respectively, and
when information is read from the disk, the controller changes a state of the polarization conversion element to give such polarization that the polarization spectroscopic element guides the light into the first waveguide.

18. The disk drive according to claim 13,
wherein the head slider includes a coil between the write element and the read element, closer to the read element than to the write element, and
when information is read from the disk, the controller allows a current to flow into the coil.

19. The disk drive according to claim 13, wherein the head slider includes the light source.

* * * * *